(12) United States Patent
Foote

(10) Patent No.: US 6,301,966 B1
(45) Date of Patent: Oct. 16, 2001

(54) CLAMSHELL COVER ACCELEROMETER

(75) Inventor: Steven A. Foote, Issaquah, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/282,758

(22) Filed: Mar. 31, 1999

(51) Int. Cl.[7] .................... G01P 15/12; G01P 15/00; G01L 7/00
(52) U.S. Cl. ...................... 73/514.33; 73/488; 73/756
(58) Field of Search ................... 73/35, 756, 431, 73/1.38, 514.33

(56) References Cited

U.S. PATENT DOCUMENTS

| | | | |
|---|---|---|---|
| 3,528,297 | * | 9/1970 | Lee ................................. 73/514.33 |
| 3,557,628 | * | 1/1971 | Tsukada .......................... 73/514.33 |
| 4,373,378 | * | 2/1983 | Fujishiro et al. ....................... 73/35 |
| 5,373,739 | * | 12/1994 | Azetsu et al. ...................... 73/514.33 |
| 5,394,751 | * | 3/1995 | Ishibashi ................................ 73/756 |

FOREIGN PATENT DOCUMENTS

| | | | | |
|---|---|---|---|---|
| .348361 A2 | * | 12/1989 | (EP) | .............................. H01L/23/04 |
| WO 91/19985 | * | 12/1991 | (EP) | .............................. G01P/1/02 |
| WO 92/20096 | * | 11/1992 | (EP) | .............................. H01L/23/02 |
| WO 91/19985 | | 12/1991 | (WO) | ............................. G01P/1/02 |
| WO 92/20096 | | 11/1992 | (WO) | ............................. H01L/23/02 |

\* cited by examiner

*Primary Examiner*—Helen Kwok
*Assistant Examiner*—K. Wilson

(57) ABSTRACT

A method and apparatus for enclosing a sensing device, such as an accelerometer, for reducing outside forces and strains on the sensing device. The cover includes two parts that bond to each other thereby forming a clamshell-type cover. The sensing device can float within the cover, is bonded to bonding points on one of the cover parts or is held in place by a pressure fit of the two cover parts on the sensing device.

10 Claims, 4 Drawing Sheets

CLAMSHELL COVER ACCELEROMETER

FIELD OF THE INVENTION

The present invention relates to the design and construction of accelerometers, and more specifically to accelerometer covers.

BACKGROUND OF THE INVENTION

Small, high performance accelerometers are typically made of silicon. As shown in FIGS. 1 and 2, accelerometers commonly employ a planar construction method. A monolithic silicon substrate is micro-machined to yield a pivot mechanism, usually a proof mass suspended from a stationary frame by flexure hinges. The hinges allow rotation of the proof mass about a hinge axis. Top and bottom cover plates are used as damping surfaces and shock stop restraints. Referring to FIG. 2, these cover plates are then bonded to the mechanism that includes the suspended proof mass to form a completed die stack. The die stack in turn is bonded into a header with appropriate drive electronics attached to form the completed accelerometer.

Unfortunately, these bonding operations directly impair accelerometer performance. Available bonding materials, such as epoxy, glass frit, etc., generally have a coefficient of thermal expansion substantially different from that of the silicon. Because the bonding is usually performed at elevated temperatures, there is a standing internal stress condition between the silicon and the bond joints. The delicate sensing mechanism often becomes warped during this bonding process. Relaxation of the internal stress over time and temperature generates drift and hysteresis that limit accelerometer performance.

Attempts have been made to isolate the basic mechanism from bond joint stress. An illustrative scheme is presented in FIG. 3. This arrangement involves suspending the acceleration mechanism on a frame, forming the cover bond joints on an outer rim and connecting the frame to the outer rim with suspension beams. This and other prior art arrangements have alleviated the problem somewhat, but they fail to address the source of the problem. Also, the isolation feature generally adds the expense of extra silicon and design complications. Similar arguments apply to joints attaching the completed sensor mechanism to the package header in a completed accelerometer.

SUMMARY OF THE INVENTION

The present invention provides a direct reduction of driving stress. It also provides improved isolation at no additional cost. Furthermore, it presents an option to substantially decrease production costs by minimizing usage of expensive silicon. This significant advance in the art is accomplished by replacing conventional cover plates with "clamshell" cover plates so that the sensing mechanism is housed within the plates. A single cover-to-cover bond on the centerline of the cover plate bonding areas bonds the plates to each other. Sensor bonds are optional in a clamshell design. If sensor bonds are desired, they are localized and isolated from the sensing mechanism. Thus, the clamshell design solves the problem of internal stresses more effectively and less expensively than the prior art isolation structures.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

Figure 1:
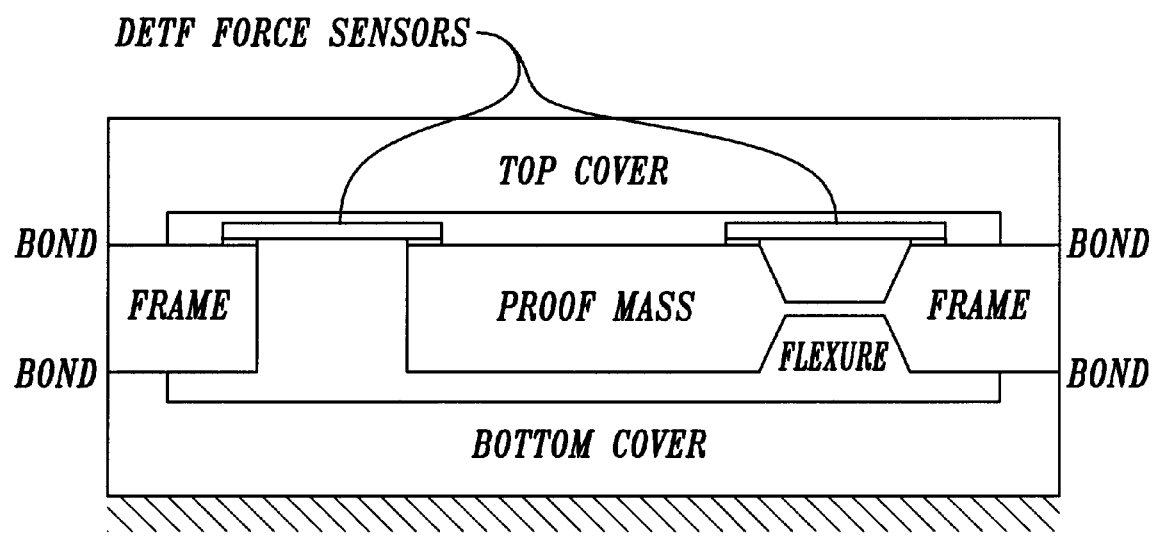
FIG. 1 is a cross-sectional view of a typical accelerometer.
Figure 2:
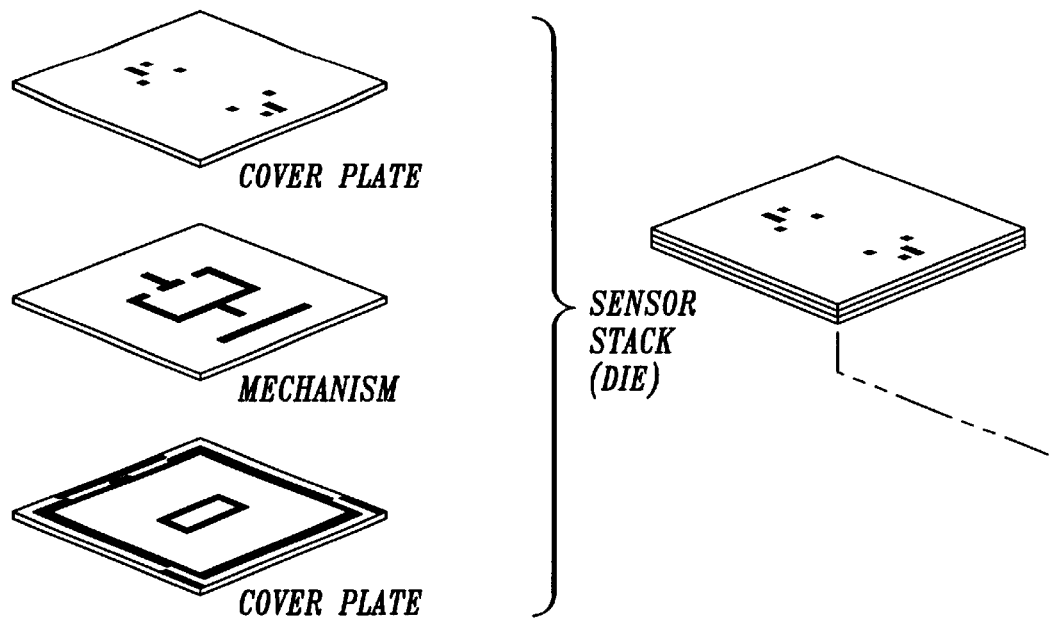
FIG. 2 is an exploded view of the accelerometer shown in FIG. 1.
Figure 3:
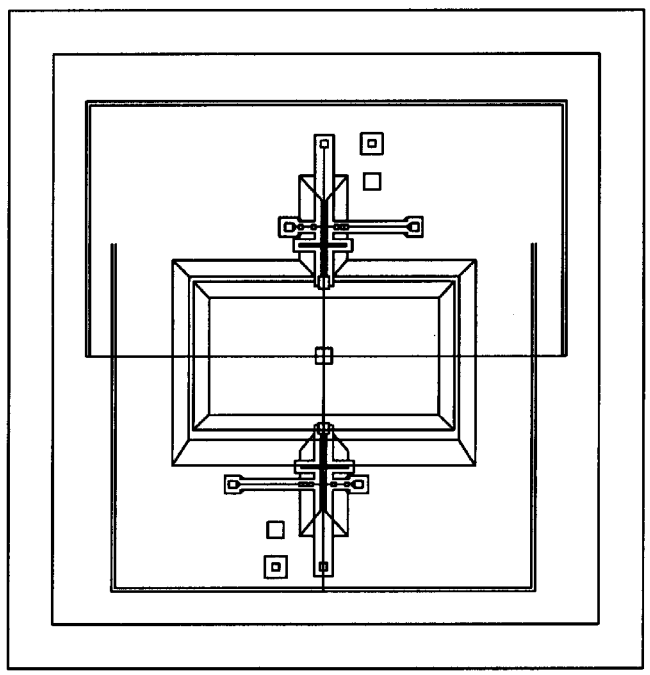
FIG. 3 illustrates a typical accelerometer mechanism with supporting frame and isolation feature.
Figure 4A:
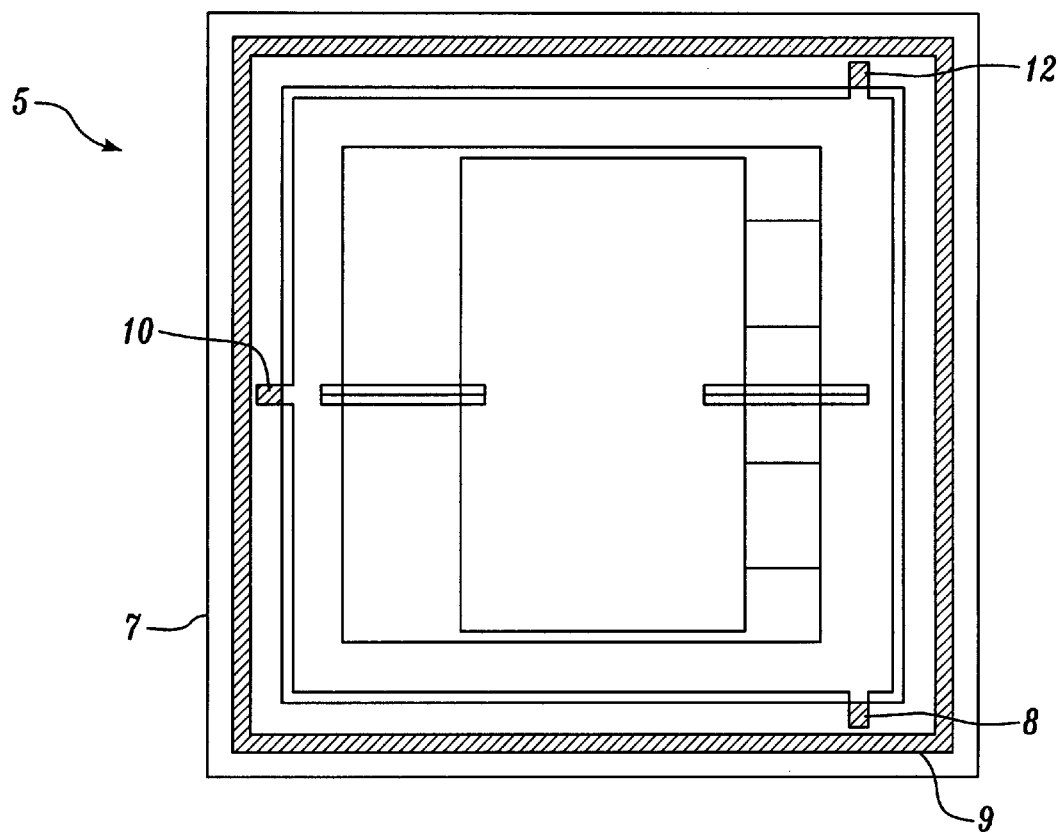
FIG. 4A illustrates a top view of the lower half of a clamshell over accelerometer formed in accordance with the present invention.
Figure 4B:
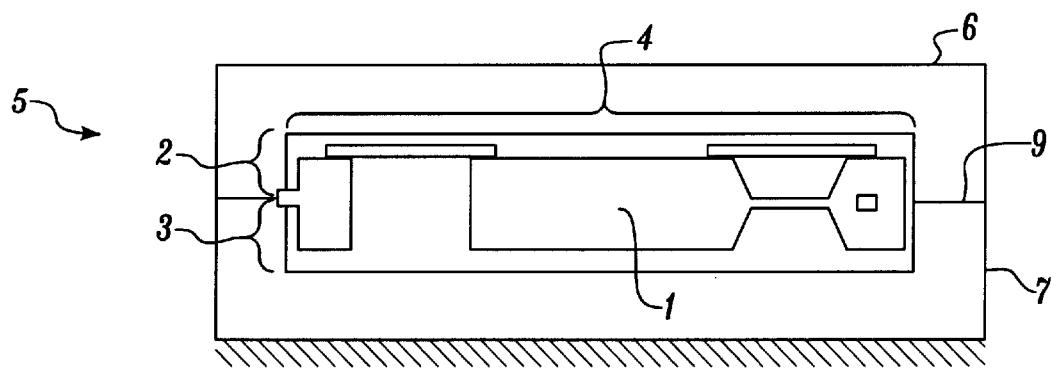
FIG. 4B illustrates a side view of a clamshell cover accelerometer shown in FIG. 4A.

A clamshell cover 5 for an accelerometer/sensing mechanism 4 formed in accordance with the present invention is illustrated in FIGS. 4A and 4B. In the present invention, cover plates 6 and 7 include more deeply etched cavities 2 and 3, so that instead of merely providing setback for the motion of the accelerometer's proof mass 1, room is provided for the entire sensing mechanism 4. The sensing mechanism 4 is thus entirely enclosed inside the cover plates 6 and 7, with the cover plates 6 and 7 bonded to each other by a centerline bond 9. The sensing mechanism 4 is bonded to bond points 8, 10 and 12 that are attached to the cover plates 6 and 7. the bond points 8, 10 and 12 are preferably very small, localized and optimally placed for minimum sensor impact. The bond points 8, 10 and 12 can be substituted by holding the sensing mechanism 4 in place by contact pressure (shown in FIG. 5), or simply floating the sensing mechanism 4 as captured between the clamshell covers 6 and 7 (shown in FIG. 6).

In constructing an actual mechanism, it is likely that the sensor silicon will be thinned towards the centerline at the localized contact points with the cover plates. This will put these local stress points at or close to the centerline to reduce warping and to isolate the sensor from even this small error driver.

The present invention thus replaces the two off-centerline cover bond joints of the prior art with a single centerline bond 9 on the cover plates 6 and 7. This immediately reduces the driving stress, since there is now only one joint and half as much bond material. It also eliminates the potential for any mismatch between top and bottom joints that will otherwise warp the mechanism out of plane. Just as important, however, is the location of the one remaining joint. By positioning the joint 9 symmetrically on the centerline, any bending moment arm through which the bond joint can warp the sensing mechanism 4 is eliminated. Finally, the centerline bond 9 is inherently isolated from the sensing mechanism 4 since it only contacts the sensing mechanism 4 at defined localized points. This allows the internal isolation structure to be eliminated for most if not all applications.

The present invention also provides several cost-saving advantages. Since the sensor mechanism 4 is internally captured by the clamshell covers 6 and 7, the present invention is self-tooling for individual placement of mechanisms into cover wafers before bonding. At first, this might not seem to be an advantage since whole mechanism wafers and cover wafers are currently bonded in one operation at the wafer level. However, whole wafer bonding demands that both good mechanisms and bad be bonded. As a result, any sensor yield loss is multiplied through associated labor costs and lost covers. Additionally, the prior art demands that the sensor silicon area be equal to the cover plate silicon area. Since the cost of silicon for the sensors is more than an order of magnitude greater than the cost of the cover silicon, even a small reduction in sensor material represents a large reduction in cost. The present invention eliminates sensor silicon area currently needed for an isolation feature. It also allows the sensor silicon area to be much smaller than the cover plate area since individual mechanisms can easily be placed into the recesses in whole cover plate wafers for single operation bonding. Additionally, only good sensor mechanisms need be bonded. All of these features conserve expensive sensor silicon.

An important advantage of the present invention is that it does not require individual placement of the sensor mechanisms into the cover plates as described above. The manufacturer may choose this option and the corresponding benefits. However, should whole wafer processing be deemed more beneficial, then the sensor mounting tabs 8, 10 and 12 shown in FIG. 4A would simply be extended out through the sides of the cover plates 6 and 7. These tabs would then be severed when the bonded assembly is diced.

The present invention also provides greater flexibility of design, allowing for design options not otherwise feasible. Since the self-tooling cover plates allow for easy placement of individual mechanism dice known to be good, multiple designs are much more easily accommodated. Thus, design changes and process experiments become economical instead of prohibitive. These advantages easily outweigh the cost of placing individual dice into self-tooling cover wafers, an operation that could be automated in large-scale production.

Figure 5:
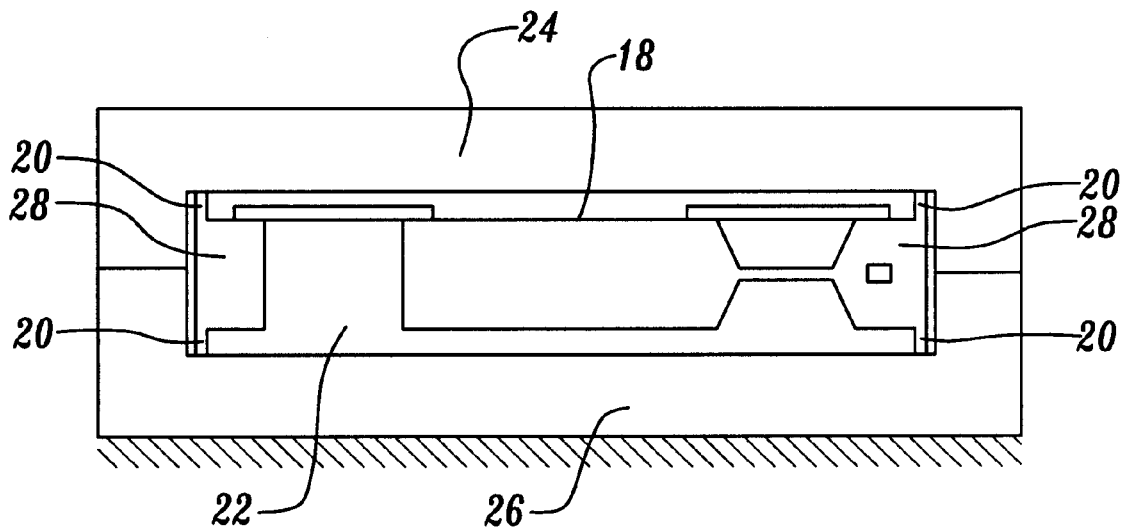
FIGS. 5 and 6 illustrate alternate embodiments of the present invention.
Figure 6:
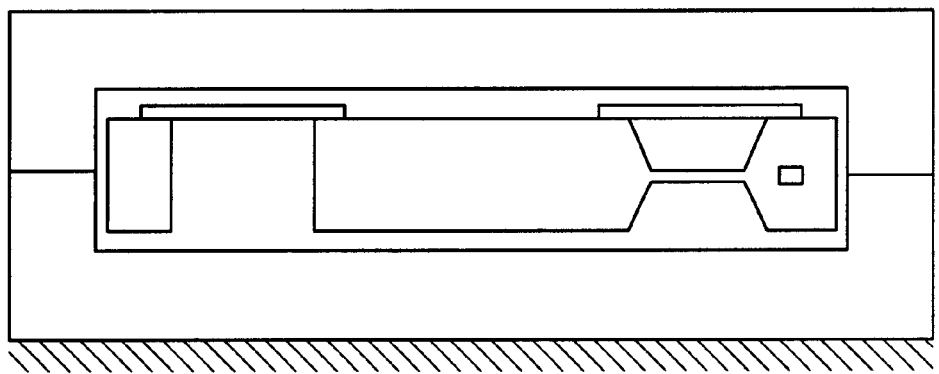

FIG. 5 illustrates a sensing device 18 that is held within the cavity 22 formed by two cover plates 24 and 26 by applying contact pressure to contact struts 20 located on the frame 28 of the sensing device 18. The contact struts 20 are sized to allow a gap at the bonding centerline of the cover plates 24 and 26. The gap width is a predetermined size for acceptably receiving the bonding material.

While the preferred embodiment of the invention has been illustrated and described, it will be appreciated that various changes can be made therein without departing from the spirit and scope of the invention.

What is claimed is:

1. An apparatus for housing a sensing device, said apparatus comprising:
    a top cover with a cavity formed by a base and a wall mounted to the edges of the base; and
    a bottom cover with a cavity formed by a base and a wall mounted to the edges of the base, wherein said wall of the bottom cover and the wall of the top cover are bonded together at a bonding joint which lies along a centerline of the sensing device to form a cavity for housing the sensing device.

2. The apparatus of claim 1, further comprising:
    one or more bond points separate from the bonded walls for bonding the sensing device to at least one of the top and bottom covers.

3. The apparatus of claim 1, further comprising:
    contact struts for securing the sensing device within the cavity formed by the bonded walls.

4. A sensing device comprising:
    a top cover with a cavity formed by a base and a wall mounted to the edges of the base;
    a bottom cover with a cavity formed by a base and a wall mounted to the edges of the base, wherein said wall of the bottom cover and the wall of the top cover are bonded together at a bonding joint which lies along a centerline of the sensing device to form a cavity; and
    a sensing device positioned within said cavity formed by the bonded walls.

5. The apparatus of claim 4, further comprising:
    one or more bond points separate from the bonded walls for bonding the sensing device to at least one of the top and bottom covers.

6. The apparatus of claim 4, further comprising:
    pressure struts on the sensing device for securing the sensing device within the cavity formed by the bonded walls.

7. The apparatus of claim 4, wherein said sensing device is an accelerometer.

8. A method for enclosing a sensing device within top and bottom covers, said top and bottom covers are cup-shaped with walls supported by a base, said method comprising:
    inserting the sensing device into a cavity formed by the walls of at least one of the top or bottom covers; and
    bonding the wall of the top cover to the wall of the bottom cover at a bonding joint which lies along a centerline of the sensing device to form a cavity that encloses the inserted sensing device.

9. The method of claim 8, wherein inserting further comprises:
    bonding the sensing device to bonding points on at least one of the top or bottom covers.

10. The apparatus of claim 8, wherein bonding further comprises:
    securing under pressure the sensing device within the formed cavity.

* * * * *